Jan. 30, 1962 H. F. CURTIS 3,018,771
PORTABLE AND ADJUSTABLE CHARCOAL GRILL
Filed Aug. 5, 1955 4 Sheets-Sheet 1

INVENTOR,
Harold F. Curtis
BY
Charles Shepard
ATTORNEY.

INVENTOR,
Harold F. Curtis
BY Charles Shepard
ATTORNEY.

United States Patent Office 3,018,771
Patented Jan. 30, 1962

3,018,771
PORTABLE AND ADJUSTABLE CHARCOAL
GRILL
Harold F. Curtis, Irondequoit, N.Y.
(9 Country Club Drive, Rochester 19, N.Y.)
Filed Aug. 5, 1955, Ser. No. 526,678
2 Claims. (Cl. 126—25)

This invention relates to a grill for burning charcoal or comparable fuel.

An object of the invention is the provision of a generally improved and more satisfactory grill of this kind.

Another object is the provision of a grill which is readily adjustable to vary the distance from the fire to the food being cooked, and in which the heat of the fire may also be controlled accurately and easily by controlling the draft thereof.

Still another object is the provision of a practical and efficient grill which is sufficiently small and low so that it may be carried indoors and placed within an ordinary indoor fireplace in the event of inclement weather, yet it may be made sufficiently high, by the use of extension legs or the like, to be convenient for use outdoors.

A further object of the invention is the provision of a grill in which the fire may be started with extreme ease, which is economical of charcoal consumed during desired cooking operations, and in which the unconsumed charcoal may be quickly extinguished and saved for future use, when the cooking operation is finished.

A still further object is the provision of a grill which is of neat and attractive appearance, relatively light and portable, easily kept clean, and easy to manipulate and handle.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
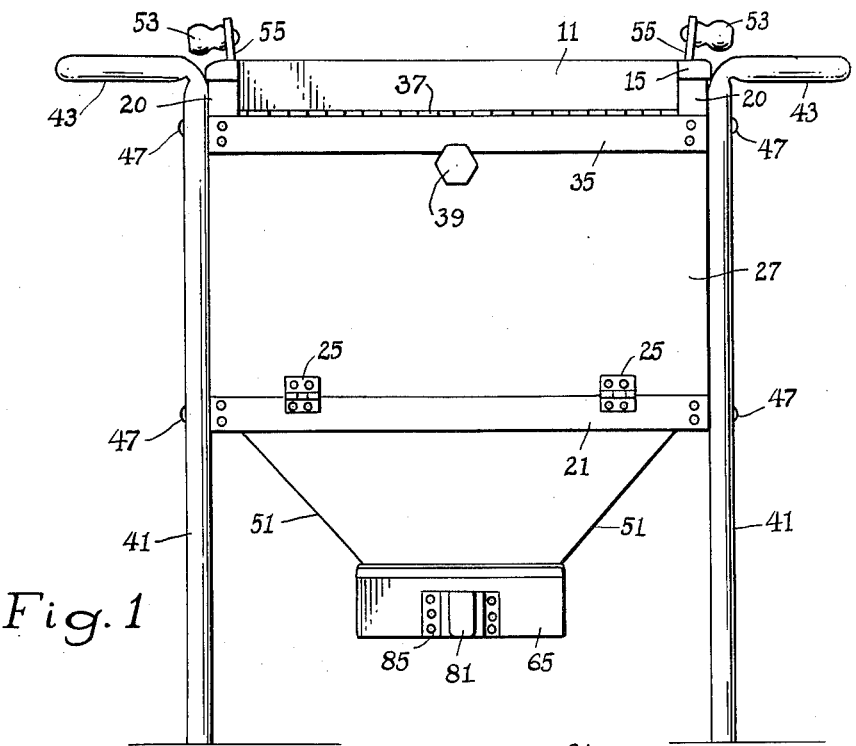
FIG. 1 is a front elevation of the grill according to a preferred embodiment of the invention, with the extension legs removed and with the fire box and grate in the lowest of their various adjustable positions.

In its preferred form, the grill comprises a main body of rectangular or preferably square plan, formed of upstanding sheet metal walls. The rear wall 11 and side walls 13 are preferably stationary and formed of a single integral piece of sheet metal bent into somewhat U-shaped plan. Each of these walls has a rolled-over upper edge 15 to avoid a sharp or raw edge which might injure a person coming into contact therewith, and an inwardly bent horizontal bottom flange 17. Where the flanges 17 overlap each other at the two rear corners, they are riveted to each other at 19. The forward edges of the side walls 13 also have small vertical flanges 20 extending laterally toward each other.

Figure 4:
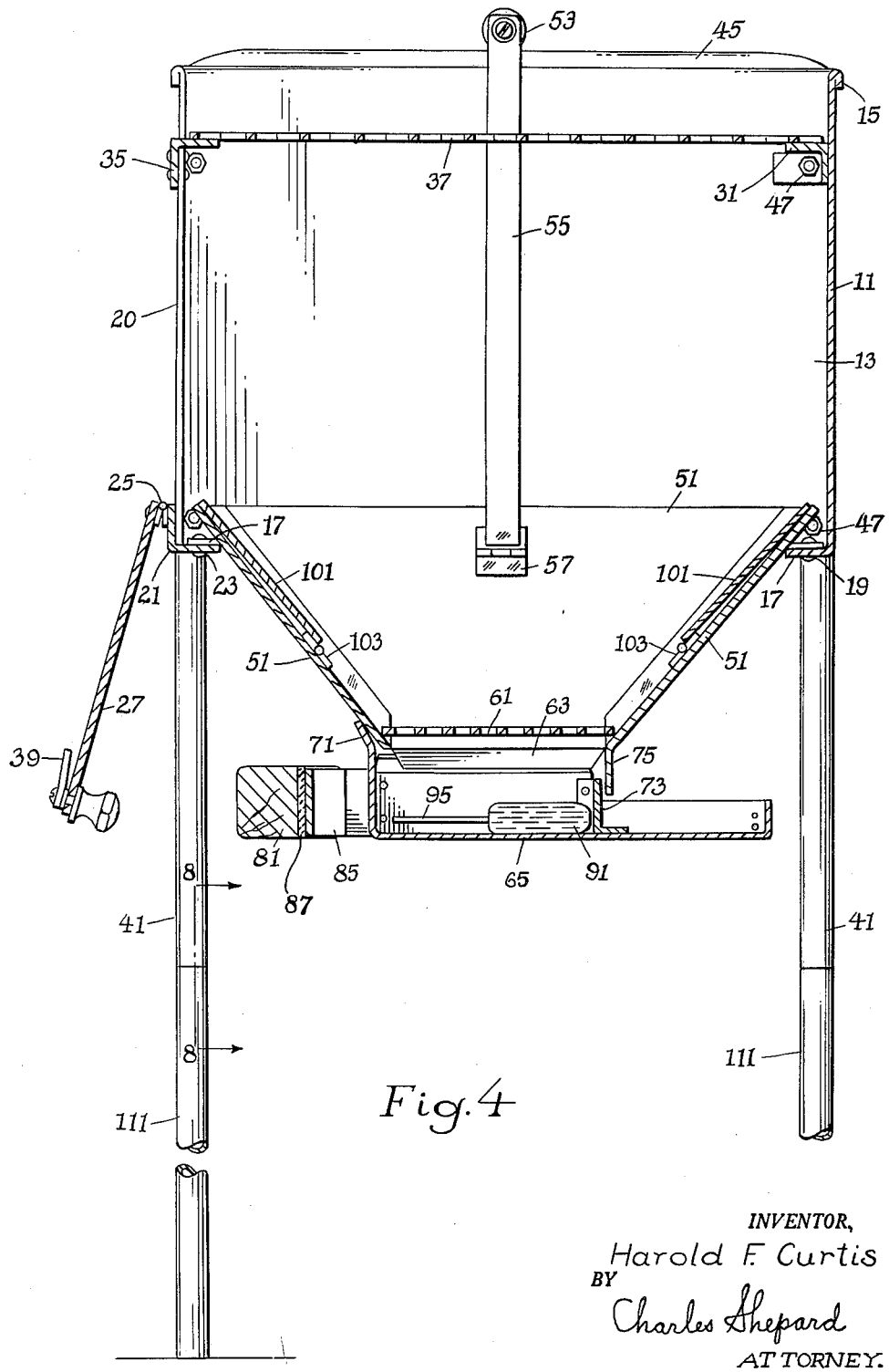
FIG. 4 is a vertical section taken approximately on the line 4—4 of FIG. 2, also showing the extension legs in place.

On the fourth or front side of this main body, an angle bar 21 (FIGS. 4 and 5) extends across from the bottom edge of one side wall 13 to the bottom edge of the other side wall 13, and is secured by rivets 23 to the flanges 17 of the side walls. This bar 21 serves as a support for the hinges 25 of the front wall 27 hinged at the bottom so that it may be swung outwardly and downwardly to open the entire front of the main body (as seen in FIG. 4) for easy access to the fire box and grate described below. At its lateral edges, the door 27 fits tightly against the wall flanges 20, when closed.

An angle bar 31 extends across the inside face of the rear wall 11 a little below the top, as seen in FIG. 4, and is suitably secured to the rear wall and at its ends to the side walls 13. A similar angle bar 35, at the same elevation, extends across the front of the body, but is supported only at its ends from the side walls 13 or the flanges 20 thereon, not being attached to the hinged front wall 27, so it does not interfere with opening the front wall. The inwardly extending horizontal flanges of these two bars 31 and 35 serve as a support for the grill member 37, of perforated or preferably of expanded metal, such as expanded metal lath. A pivoted latch 39 near the upper edge of the door 27 engages the vertical flange of the angle bar 35, to keep the door closed. When closed, the door comes up only to the bottom of the cross bar 35, but the side and rear walls rise a little above the level of the grilling surface 37, as shown.

Figure 2:
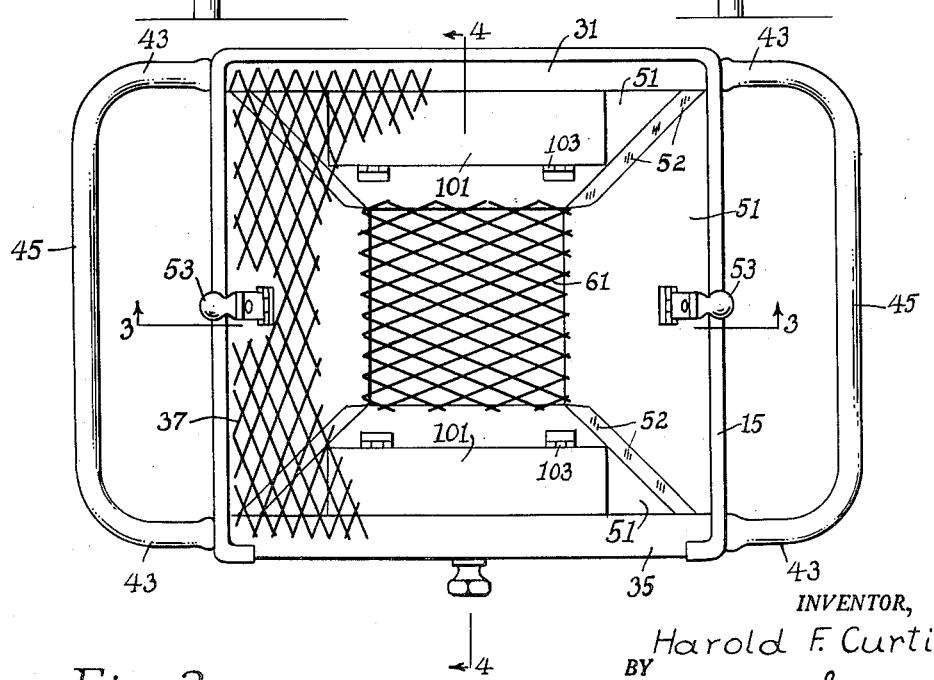
FIG. 2 is a plan of the construction shown in FIG. 1, with a part of the grilling screen omitted in order to show better the construction beneath.

The upright structure formed by the walls 11, 13, and 27 is supported by suitable means such as, for example, the legs 41 arranged vertically at the four corners of the wall structure. Preferably the legs at the two corners on one side of the body are both formed from a single integral piece of bent tubing, and the legs at the two corners on the other side of the body are similarly formed from a single integral piece of bent tubing, the tubing in each instance being bent laterally outwardly at 43 at the upper end of the vertical part of the leg, and thence extending in a fore-and-aft direction at 45 to the similar laterally bent portion 43 at the top of the vertical portion of the adjacent leg, all as will be plainly apparent from FIGS. 1 and 2. Thus the portions 45 form convenient handles, laterally spaced from the body of the grill, and in a position to be easily grasped for moving the grill from place to place. The vertical portions 41 of the legs are secured to the walls of the body by suitable bolts 47 passing horizontally through the legs and the walls, certain of the fastenings preferably passing also through bent ears at the ends of the cross bars 31 and 35, as shown.

Figure 3:
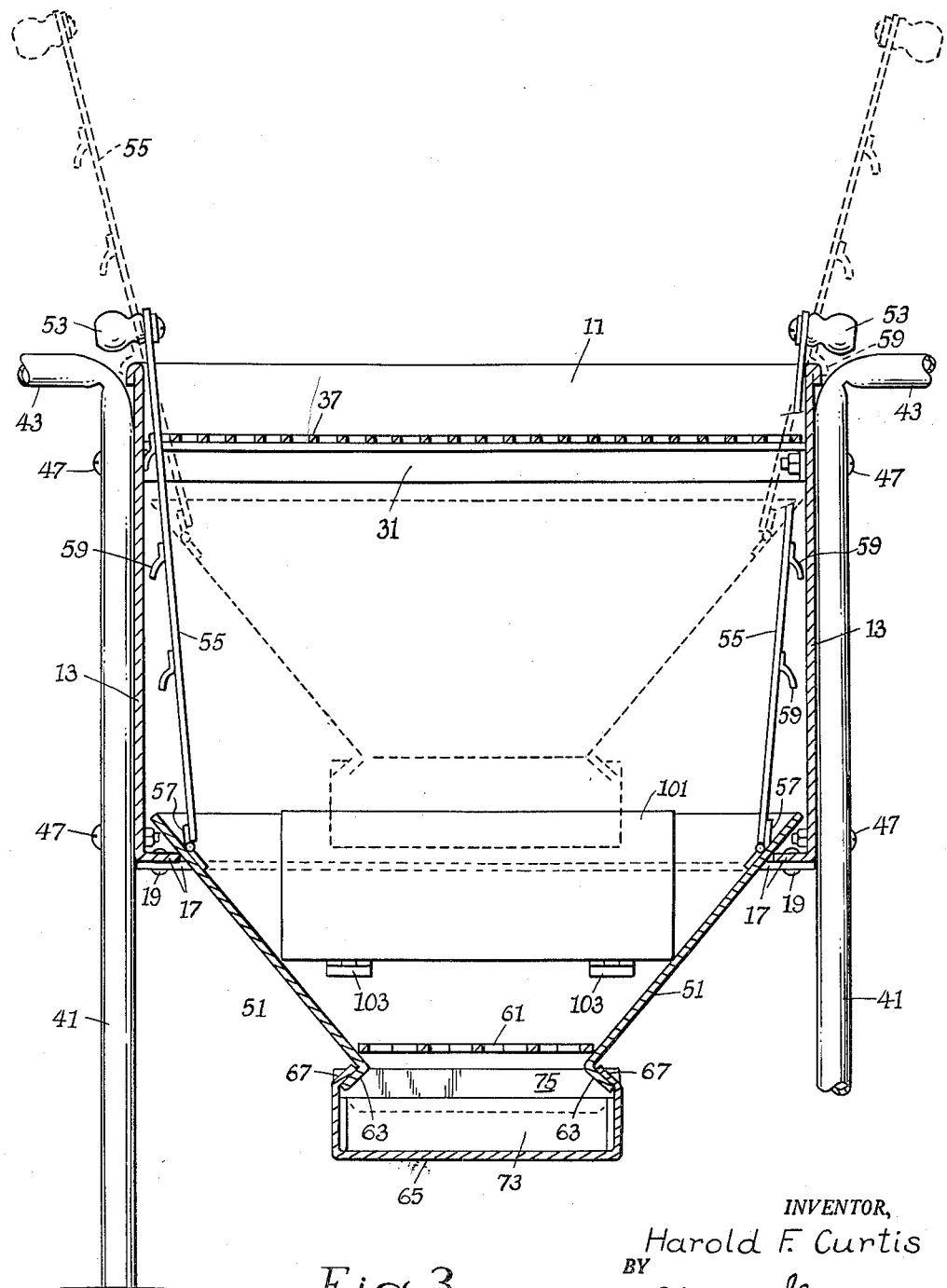
FIG. 3 is a vertical section taken approximately on the line 3—3 of FIG. 2, on a larger scale, showing the fire box in its lowest position in full lines, and in its highest position in dotted lines.

Supported from this main body and vertically adjustable relative thereto is a fire box or fire pot portion for holding the fuel to make the fire. The fire box is of inverted pyramidal shape, having sheet metal side walls 51 which, at the larger or upper end of the pyramid, fit fairly closely within the main body, as seen in FIGS. 3 and 4, but with sufficient looseness so that the fire box may be easily raised and lowered relative to the main body. Overlapping flanges at the inclined corner seams of the fire box are welded to each other, as indicated diagrammatically at 52 in FIG. 2. When the fire box is in its lowest position, the inclined side walls 51 actually rest upon and are supported by the inwardly extending flanges 17 of the main body walls, as seen in FIG. 3, and by the horizontal flange of the angle bar 21 at the front, as seen in FIG. 4. When higher positions are desired, to bring the fire closer to the food on the supporting screen 37, the entire pyramidal fire box is pulled upwardly by grasping and lifting the handles 53 secured to the upper ends of hanger bars or links 55 hinged at their lower ends at 57 to two opposite side walls 51 of the pyramidal fire box structure and provided with a series of hooks 59 at vertically spaced intervals on the links 55, any desired pair of hooks being hooked over the upper edge of the side walls 13 of the main body, as shown in dotted lines in FIG. 3, to support the fire box at any desired height. The hanger links 55 extend up through small notches cut in the screen 37.

Near the bottom or smaller end of the pyramidal fire box or fire pot structure is a grate 61, preferably made of reticulated metal such as expanded metal lath or the like, and it may be of the same kind of metal used for the top screen 37. No special supporting flange or ledge is necessary for the grate 61, it being found that the inclination of the pyramidal walls 51 on all four sides is sufficient to maintain the grate 61 level when it is merely laid loosely in the fire box. On two opposite lateral sides, the lower edges of the fire box walls 51 are flared outwardly at 63, as seen in FIG. 3, to form a support for the ash receiving and draft controlling drawer indicated in general at 65 and having, at the top edges of its two lateral side walls, inwardly bent flanges 67 which overlie and are supported by the flanges 63 of the fire box. The mating flanges 63 and 67 thus form a horizontal guideway on which the drawer 65 may move forwardly or rearwardly, the weight of the drawer at all times maintaining a substantially airtight contact between the parts 63 and 67.

Figure 7:
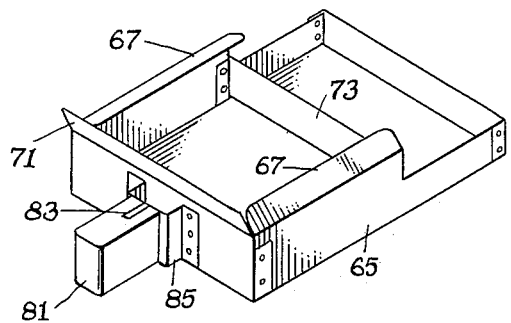
FIG. 7 is a perspective view of the draft controlling and ash receiving drawer with certain parts omitted for the sake of clarity.

As best seen in FIGS. 4 and 7, the front wall of the drawer 65 extends vertically for some distance, and then is bent slightly forwardly as at 71. When the drawer is in its rearmost position, the flange 71 makes contact with the front wall 51 of the fire box, as seen in FIG. 4. At this time, an intermediate partition 73 extending across the drawer 65 is substantially in contact with a downwardly extending lip or flange 75 at the bottom of the rear wall 51 of the fire box. Thus when the control drawer is in its rearmost position, the draft is substantially completely cut off. But when the drawer 65 is pulled forwardly from the rearmost position shown in FIG. 4, draft may enter, both between the parts 73 and 75, at the rear, and also between the parts 71 and the fire box, at the front. The farther the drawer is pulled forwardly, the more air may enter, so the position of the drawer serves as a very close control of the amount of draft. The drawer is extended rearwardly a considerable distance beyond the partition 73, as well seen in FIGS. 4, 5, and 7, so that even in its most forward position, the rear part of the drawer still underlies the bottom opening of the pyramidal fire box, so as to be in a position to catch all ash falling through the grate 61.

To enable easy manipulation of the drawer even when it is hot by radiation or conduction of heat from the fire, an insulating handle is provided. This comprises a block 81 of wood (FIGS. 4, 5, and 7) having at its rear end a narrow slot 83 which receives and is retained by a flange on a metal bracket 85 welded or otherwise secured to the front wall of the drawer 65. An insulating layer 87 of asbestos is interposed between the block 81 and bracket 85.

Figure 5:
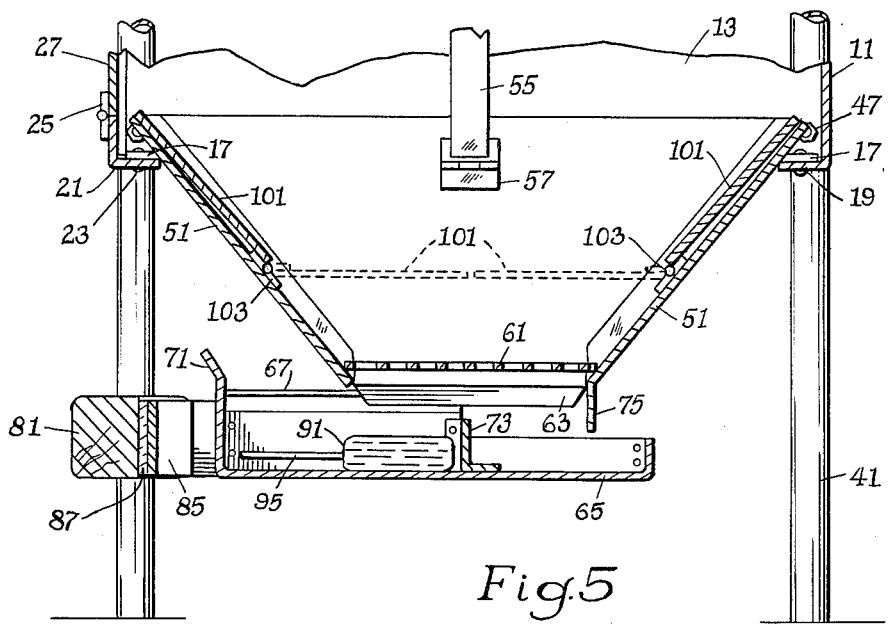
FIG. 5 is a fragmentary view similar to a portion of FIG. 4, showing the draft controlling drawer moved to an open position to allow greater draft to the fire.
Figure 6:
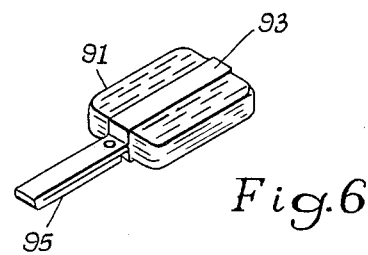
FIG. 6 is a perspective view of a lighter element.

A lighter is provided, in the form of a wick 91 of woven asbestos or similar material, enclosed and retained by a metal strap 93 having an extension 95 which forms a convenient handle for the wick. The entire wick and handle are sufficiently small to be laid in the front compartment of the drawer 65, as seen in FIGS. 4 and 5. When the charcoal is placed in the fire box 51 on the grate 61, the wick 91 is dipped into alcohol or gasoline or other suitable igniter fluid, then is laid flat in the drawer 65 in the position shown in FIGS. 4 and 5, and is ignited with a match. The drawer is then slid rearwardly onto the guideway flanges 63, but not all the way to the back, so as to allow space for draft to enter. The flame from the burning alcohol or other liquid which has previously been absorbed in the wick 91, rises upwardly through the foraminous grate 61 and quickly ignites the charcoal on the grate, without the need for using paper or other kindling. The front wall 27 of the main body is, of course, closed at this time and latched by the latch 39. The very substantial chimney effect produced by the reasonably tight enclosing walls 51, 11, 13, and 27 produces in short order a very vigorous and hot fire on the grate 61, especially when the fire box is in its lowest position, resting on the flanges 17 to prevent entrance of air except through the grate and fuel. As the fire burns, the inclination of the walls of the fire box serves to keep the supply of fuel concentrated at the center, over the hotest part of the fire, where fresh fuel is quickly ignited. The fire box is adjusted upwardly or downwardly as required, by means of the handles 53, such adjustment being entirely possible without danger or discomfort no matter how hot the fire may be. Thus the fire is brought to the required distance from the food, which may rest either directly on the foraminous grill support or screen 37, or in pots or pans which in turn are placed on the screen 37.

If the fire is too hot, the drawer 65 is closed completely or partially, to eliminate or reduce the draft. If a hotter fire is wanted, the drawer 65 is pulled farther forwardly, to allow greater draft. Because of the efficiency of the fire, enclosed within the various walls, and kept concentrated by the pyramidal shape of the fire box, a rather small amount of charcoal can accomplish a great deal of cooking. But if the initial charge of charcoal is insufficient and more is needed, the front wall 27 is unlatched and opened, and additional fuel is placed on the fire.

No ashes fall to the ground, all ash being caught by the drawer 65 so that at the completion of the fire the drawer may be pulled outwardly and turned upside down to dump the ash in any selected location. Because of the ash drawer, the grill can be used without damage to lawn or other surface beneath the grill.

When cooking is completed, the fire may quickly be put out and the unconsumed portion of the charcoal saved for future use. This is accomplished by means of two damper flaps 101 (FIG. 5) hinged respectively to the front and back pyramidal walls 51 of the fire box, at hinges 103. While the fire is burning, the damper plates or flaps 101 extend obliquely upwardly from the hinges and lie flat against the walls of the fire box, as shown in full lines in FIG. 5. When it is desired to stop the fire quickly, the front wall 27 is opened and a poker or similar implement is used to swing the flaps 101 inwardly and downwardly to the dotted line position shown in FIG. 5, where they substantially completely cover the fire in an almost airtight manner, since the adjacent edges of the two flaps make close contact with each other, while the ends of the flaps rest upon and make airtight contact with the lateral or side walls 51 of the pyramidal structure. The closing of these flaps, coupled with the closing of the draft drawer 65, eliminates practically all air from the fire, which quickly goes out. Thus considerable charcoal may be saved for future use on the next occasion.

Figure 8:
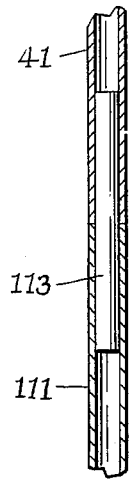
FIG. 8 is a vertical section through a joint between a main leg and an extension leg, the section being taken approximately on the line 8—8 of FIG. 4.

The legs 41 are relatively short, so that in case of inclement weather, the entire grill may be carried indoors and may be placed completely within the conventional domestic living room fireplace of normal size. Cooking may thus be accomplished in the living room of a house equipped with a conventional fireplace, securing the advantages of charcoal broiled steaks or other foods, while the smoke goes up the normal household chimney. When weather permits outdoor use of the grill, however, extension legs are applied to the bottom ends of the normal legs 41, so as to elevate the grill surface 37 somewhat higher from the ground, to make it at a more convenient height for outdoor use. These extension legs are shown at 111 in FIG. 4, and comprise tubular sections of the same diameter and style as the main leg sections 41. Each of the extension sections 111 is provided with a dowel 113 tightly and permanently fixed in the upper end of the extension leg 111, and extending upwardly above the extension leg to telescope snugly but removably into the lower end of the main leg 41, as seen in FIG. 8. These extension legs may be made of any desired length so as to elevate the grill surface 37 to the most convenient elevation, depending upon the location where the grill is to be used or the height of the householder who is to use the grill. Preferably the dowels 113 fit sufficiently snugly in the legs 41 so that the extension legs will not drop off by themselves when the entire grill structure is lifted to move it from one place to another. In other words, the dowels are retained frictionally in the legs 41, in normal use, but the friction can be easily overcome by grasping the extension legs and pulling them forcibly downwardly, to remove the extension legs whenever it may be necessary.

The dimensions may be varied to a reasonable extent, of course. However, to give a typical specific example of dimensions which have been found highly satisfactory, the following are offered. Size of grilling surface 37, 14 inches square. Larger or upper end of pyramidal fire box, 14 inches square. Grate 61, 5½ inches square. Opening at lower end of pyramidal fire box (below the grate) 5 inches square. Inclined side walls of fire box, 7 inches high, measured along the incline, not vertically. Main casing walls 11 and 13, 10½ inches high, with the grill 37 set 1½ inches below the top edge of these walls or 9 inches above the bottom edge. The permanent legs 41 are long enough to place the top edge of the casing walls 19 inches from the ground, while the extension legs 111 are 10 inches long, thus placing the top of the casing 29 inches from the ground when the extension legs are used. The casing walls 11, 13, and 27 are preferably of sheet aluminum, to reflect the heat from the fire upwardly toward the food, and the fire box and ash drawer are preferably of sheet steel. The main casing may, of course, be circular rather than square, in which case the fire box would be in the shape of an inverted truncated cone, rather than an inverted truncated pyramid.

With these typical dimensions just mentioned, there is a wide range of adjustable distance between the fire and the meat or other food being cooked on the grill surface 37, this distance being adjustable from about 3 inches to about 11 inches. Also the height of the side walls is sufficient to provide a very good chimney effect for quick starting of the fire, especially when the fire box is in its lowest position.

It is well known that the products of combustion consist largely of carbon dioxide, which is heavier than air and will tend to accumulate and remain in any confined space closed at the sides and bottom, even though open at the top. It is found in practice that with the present construction, the draft controlling drawer, when in its fully closed position, makes a sufficiently air tight joint with the fire box, and the fire box when in its lowest position makes a sufficiently airtight joint with the body, and the fire box and body together are of sufficiently great height in a vertical direction, so that a considerable amount of carbon dioxide accumulates and is retained in the structure, thus putting the fire out fairly quickly without the need for using the flaps 101. If there is any need to put the fire out with great rapidity, the flaps 101 may be used. But ordinarily, when the cooking operation is completed, there is no need to move the flaps 101 and it is quite sufficient merely to manipulate the handles 53 so as to lower the fire box to its lowest position, and close the drawer 65 to its tightly closed position, whereupon the fire will go out in a few minutes and the unconsumed part of the fuel is saved for subsequent use at another time.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A grill comprising an upright body having four deep vertical walls substantially enclosing the body in a substantially airtight manner on all sides thereof and being open at the top and bottom and defining edges thereat, a foraminous grilling surface extending horizontally within said body near the top thereof, inwardly extending ledges at the bottoms of said side walls, a firebox structure movable vertically within said body below said grilling surface, said firebox structure having four substantially airtight sidewalls downwardly inclined from a large upper end substantially snugly filling the horizontal cross-sectional area of said body to a lower end materially smaller than said area of said body, a fuel supporting foraminous grate only slightly larger than the area of said lower and smaller end of said firebox, said grate resting in said firebox substantially at the lower end thereof, said firebox movable vertically within the said body to adjust said grate to different distances from said grilling surface and being so shaped that said large upper end of said firebox is in relatively close contact on all four sides with the four walls of said body in all vertically adjusted positions of said firebox and is in substantially airtight contact with and resting upon said ledges of said body when said firebox is in its lowest adjusted position, a draft-regulating and ash-receiving drawer supported from said firebox below the smaller end thereof and slidable horizontally with respect to said firebox, said drawer and the adjacent parts of said firebox being so shaped that when said drawer is in a closed position of adjustment it forms a substantially airtight closure for the small end of said firebox and when it is moved horizontally to an open position of adjustment gaps are created between a front wall of said drawer and a front wall of said firebox and between a rear wall of said drawer and a rear wall of said firebox to allow air to flow over said front and rear walls of the drawer and into the drawer and thence upwardly into said small end of said firebox, said drawer having a bottom wall extending between said front and rear walls of said drawer and continuing horizontally rearwardly a substantial distance beyond said rear wall of said drawer to constitute an ash-catching surface lying beneath said small end of said firebox when said drawer is adjusted forwardly to its open position allowing a flow of air, a pair of hanger links attached by hinges to opposite sides of said firebox and rising therefrom substantially vertically along and parallel to the opposite side walls of said body and having handle portions accessible above the top edges of said side walls of said body and a plurality of hook portions on each of said hanger links to to have any selected pair of hook portions on the two links selectively hooked over and supported by said top edges of said side walls of said body to hold said firebox selectively at various elevations within said body, both of said hanger links being unconnected to said side walls of said body, aside from said hook connections, and capable of moving freely relative to said body so that the range of vertical adjustment of said firebox within said body is limited only by engagement of said firebox itself with said ledges of said body when said firebox is in its lowest adjusted position and by engagement of said firebox itself with said foraminous grilling surface when said firebox is in its highest adjusted position, said grilling surface having notches or openings along two opposite sides thereof for permitting the movement of said hanger links therethrough.

2. A cooking device comprising an upright body having deep vertical walls and being open at the top and bottom ends thereof, a foraminous grilling surface extending horizontally across the open top end of said body, a firebox being open at the upper and lower ends thereof and movable vertically within said body and including inwardly inclined downwardly extending imperforate side walls whereby the lower end of said firebox has a cross-sectional area smaller than the upper end thereof, said upper end of said firebox having a cross-sectional area slightly smaller than the cross-sectional area of said body in order to permit movement of the firebox therein and to maintain a substantially airtight relationship therebetween, a fuel grate mounted across and adjacent the lower end of said firebox, a drawer mounted across the lower end of said firebox below said fuel grate for closing the lower end of said firebox and being movable horizontally for regulating the draft through said lower end, and means for selectively positioning said firebox within said body for varying the distance between said grilling surface and said grate, said firebox being movable as aforesaid between a position wherein its upper end is adjacent the top end of said body and a position wherein its upper end is adjacent the bottom end of said body, said upright body having inwardly extending ledges at the bottom end thereof, a pair of hanger links attached by hinges to opposite sides of said firebox and rising therefrom substantially vertically along and parallel to the opposite side walls of said body and having handle portions accessible above the top edges of said side walls of said body and a plurality of hook portions on each of said hanger links in position to have any selected pair of hook portions on the two links selectively hooked over and supported by said top edges of said side walls of said body and to hold said firebox selectively at various elevations within said body, both of said hanger links being unconnected to said side walls of said body aside from said hook connections and capable of moving freely relative to said body so that the range of vertical adjustment of said firebox within said body is limited only by engagement of said firebox itself with said ledges of said body when said firebox is in its lowest adjusted position and by engagement of said firebox itself with said foraminous grilling surface when said firebox is in its highest adjusted position, said grilling surface having notches or openings along two opposite sides thereof for permitting the movement of said hanger links therethrough.

References Cited in the file of this patent

UNITED STATES PATENTS

| | | |
|---|---|---|
| 70,890 | Paris | Nov. 12, 1867 |
| 274,184 | Foss | Mar. 20, 1883 |
| 822,457 | Kerr | June 5, 1906 |
| 1,795,463 | Arnaman | Mar. 10, 1931 |
| 2,334,847 | Spiers | Nov. 23, 1943 |
| 2,484,239 | Moon et al. | Oct. 11, 1949 |
| 2,487,605 | Smith | Nov. 8, 1949 |
| 2,513,580 | Milligan | July 4, 1950 |
| 2,531,684 | Jackson | Nov. 28, 1950 |
| 2,600,234 | Foley | June 10, 1952 |
| 2,786,463 | Vincent | Mar. 26, 1957 |